United States Patent
Coulson et al.

(10) Patent No.: US 10,658,932 B2
(45) Date of Patent: May 19, 2020

(54) POWER CONTROL CIRCUIT

(71) Applicant: REDISEM LTD., Shatin, Hong Kong (CN)

(72) Inventors: David Coulson, Comberton (GB); Russell Jacques, Stevenage (GB); Niek Van Der Duijn Schouten, Hong Kong (CN)

(73) Assignee: REDISEM LTD., Hong Kong (CN)

( * ) Notice: Subject to any disclaimer, the term of this patent is extended or adjusted under 35 U.S.C. 154(b) by 0 days.

(21) Appl. No.: 16/068,147

(22) PCT Filed: Jan. 5, 2016

(86) PCT No.: PCT/CN2016/070166
§ 371 (c)(1),
(2) Date: Jul. 5, 2018

(87) PCT Pub. No.: WO2017/117714
PCT Pub. Date: Jul. 13, 2017

(65) Prior Publication Data
US 2019/0036456 A1 Jan. 31, 2019

(51) Int. Cl.
*H02M 3/24* (2006.01)
*H02M 3/335* (2006.01)
(Continued)

(52) U.S. Cl.
CPC ............... *H02M 3/24* (2013.01); *H02M 1/00* (2013.01); *H02M 3/3376* (2013.01);
(Continued)

(58) Field of Classification Search
CPC .......... H02M 3/22; H02M 3/24; H02M 3/325; H02M 3/337; H02M 3/33507;
(Continued)

(56) References Cited

U.S. PATENT DOCUMENTS 5,930,121 A * 7/1999 Henry ................ H05B 41/3927
                                                          315/307
6,198,234 B1 * 3/2001 Henry ................ H05B 41/2824
                                                          315/291
(Continued)

FOREIGN PATENT DOCUMENTS

CN        101164221 A        4/2008
CN        101378232 A        3/2009
(Continued)

OTHER PUBLICATIONS

State Intellectual Property Office of the People's Republic of China (SIPO), International Search Report (ISR), PCT/CN2016/070166, dated Oct. 11, 2016, pp. 1-3, SIPO.

*Primary Examiner* — Adolf D Berhane
(74) *Attorney, Agent, or Firm* — Carmichael & Co.

(57) ABSTRACT

There is provided a current control circuit for a power converter. The power converter has a primary circuit for receiving a supply current across a first supply rail and a second supply rail. There is a primary connection in the primary circuit. The power converter also has a secondary circuit providing an output current. There is a secondary connection in the secondary circuit. The secondary connection is connected to the primary connection. A controller controls one or more switches in the primary circuit to control the output current. The nature of the power converter is such that it has a reactive circuit which produces a reactive current. The current control circuit comprises a current sensing circuit connected to bypass or cancel the reactive current. The controller is connected to the current sensing circuit and controls the one or more switches based on a signal current sensed by the current sensing circuit.

20 Claims, 12 Drawing Sheets

(51) Int. Cl.
  *H02M 3/337* (2006.01)
  *H02M 1/00* (2006.01)
  *H05B 45/37* (2020.01)

(52) U.S. Cl.
  CPC ... *H02M 3/33507* (2013.01); *H02M 3/33569* (2013.01); *H02M 2001/0009* (2013.01); *H05B 45/37* (2020.01)

(58) Field of Classification Search
  CPC ............... H02M 3/33569; H02M 1/00; H02M 2001/0009; H05B 53/0815
  See application file for complete search history.

(56) References Cited

U.S. PATENT DOCUMENTS

| | | | | |
|---|---|---|---|---|
| 7,459,893 B2* | 12/2008 | Jacobs | .................. | H02M 3/157 323/282 |
| 7,948,774 B2* | 5/2011 | Scheel | .................. | H02M 3/158 323/235 |
| 8,842,449 B1* | 9/2014 | Tong | .................. | H02M 3/33507 363/21.02 |
| 2013/0094248 A1* | 4/2013 | Jacques | .................. | H01F 38/20 363/19 |
| 2014/0361698 A1* | 12/2014 | Pereira | .............. | H05B 33/0809 315/193 |
| 2015/0124489 A1* | 5/2015 | Dai | ........................ | H02M 3/335 363/17 |
| 2015/0381055 A1 | 12/2015 | Ohtake | | |
| 2019/0386573 A1* | 12/2019 | Jacques | .................. | H02M 3/073 |

FOREIGN PATENT DOCUMENTS

| | | |
|---|---|---|
| CN | 101490938 A | 7/2009 |
| CN | 102017380 A | 4/2011 |
| CN | 104617792 A | 5/2015 |
| WO | 2008104919 A | 9/2008 |

* cited by examiner

POWER CONTROL CIRCUIT

TECHNICAL FIELD

The present invention relates to power control circuits and methods used in power converters and power conversion methods. The present invention is described herein primarily in relation to DC to DC power converters and power conversion methods suitable for use in respect of light emitting diode (LED) drivers, battery chargers, and other applications requiring precisely regulated load currents, but is not limited to these particular applications.

BACKGROUND ART

Many design applications, particularly those involving battery charging and LED lighting, require power converters that can deliver precisely regulated load current. In most cases, the power converter is an isolating type, having a primary circuit and secondary circuit which are magnetically inductively coupled by an isolating power transformer. In almost all of these applications, there is a power controller situated on the primary side, with a current-sensing circuit on the secondary side, from which the feedback signal is derived and communicated to the primary-side controller using an optocoupler or similar means.

Resonant power converter topologies are well-suited to power conversion applications owing in large part to their virtues of high efficiency and low radio-frequency (RF) emissions. In particular, the half-bridge topology converters are becoming increasingly common, in particular those with LC (inductor-capacitor, also known as series-resonant), LLC (inductor-inductor-capacitor), LCC (inductor-capacitor-capacitor) and LLCC (inductor-inductor-capacitor-capacitor) topologies.

Many off-line power converter applications, such as LED drivers, require a constant current (CC) output characteristic which has very low ripple content and is precisely regulated. A common approach is to sense the output current directly on the secondary side and communicate this to the power controller on the primary side with an isolating device, such as an optocoupler. This method can increase the size and cost of a product. It is therefore advantageous to use a CC method which achieves a similar degree of precision at a lower cost.

Primary sensing current regulation (PSCR) is a method which can achieve an adequate degree of CC control in applications which have a relatively narrow range of line and load conditions. For example, single-stage fixed-output LED drivers using LC (series resonant) topology are already available which use PSCR to achieve a CC output characteristic which has good accuracy and low ripple. However, these examples are not capable of dimming the output accurately (by reducing the output current level) unless additional sensing and control circuitry are provided. To extend the dynamic range while retaining good efficiency and low RF emissions, it is often practical to change to either an LLC, LCC, or a LLCC topology. However, the primary and secondary currents in these topologies do not scale well across line and load conditions, rendering primary sensing current regulation impractical.

An example of an LLCC converter is shown in FIG. 6. In FIG. 7, the currents flowing through the various parts of the power converter are shown. FIG. 7b shows the current delivered from the transformer into the output rectifier block. FIG. 7f shows the current flowing through the primary current sense resistor R1, which is clearly very different, while FIG. 7g shows the error current. The current contributions of the parallel-resonant tank components C3, L3 change both the shape and the value of the sensed average current, creating errors that increase as the output power of a converter is reduced.

For example, US20130094248A1 (see FIG. 1) discloses a method of achieving primary-side current regulation which works by sensing the primary current. This method however is subject to the errors created by currents flowing through the reactive components which appear in the circuits described.

U.S. Pat. No. 7,948,774B2 (FIG. 2) and U.S. Pat. No. 8,842,449 B1 (FIG. 3) disclose a method of achieving primary-side regulation which works by sensing the voltage developed across a capacitor placed in series with the primary transformer winding. This method will regulate for average current provided that the frequency remains constant. However, this can only be achieved if the line and load conditions remain constant, or if the power delivery can be regulated without change in frequency, as in a phase-shifted full-bridge converter, for example. Again, this method is subject to the same estimation errors as described above.

US20150124489 A1 (FIG. 4) discloses a method of achieving primary-side regulation which works by sensing the voltage developed across an isolating current transformer placed in series with the primary transformer winding. This method will achieve some measure of regulation, provided that the line and load conditions remain constant, or if the power delivery can be regulated without change in frequency, as in a phase-shifted full-bridge converter, for example. Once again, this method is subject to the same estimation errors as described above.

US20140361698 (FIG. 5) discloses a method of achieving primary-side regulation which works by sensing the peak voltage developed across a resistor placed in series with one of the switching transistors of the bridge. This method will provide poor regulation unless the line and load conditions remain constant, or if the power delivery can be regulated without change in frequency, as in a phase-shifted full-bridge converter, for example. Yet again, this method is subject to the same estimation errors as described above.

It is an object of the present invention to overcome or ameliorate at least one of the disadvantages of the prior art, or to provide a useful alternative.

TECHNICAL PROBLEM

Solution to Problem

Technical Solution

The present invention, in a first aspect, provides a current control circuit for a power converter having:
a primary circuit for receiving a supply current across a first and a second supply rail;
a primary connection in the primary circuit;
a secondary circuit providing an output current;
a secondary connection in the secondary circuit, the secondary connection connected to the primary connection;
a controller controlling one or more switches in the primary circuit to control the output current; and
a reactive circuit producing a reactive current;
the current control circuit comprising:
a current sensing circuit connected to bypass or cancel the reactive current, the controller connected to the current sensing circuit and controlling the one or more switches based on a signal current sensed by the current sensing circuit.

A second aspect of the present invention provides a power converter having:

a primary circuit for receiving a supply current across a first and a second supply rail;
a primary connection in the primary circuit;
a secondary circuit providing an output current;
a secondary connection in the secondary circuit, the secondary connection connected to the primary connection;
a controller controlling one or more switches in the primary circuit to control the output current;
a reactive circuit producing a reactive current; and
a current control circuit as described above.

A third aspect of the present invention provides method of controlling an output current in a power converter having:

a primary circuit for receiving a supply current across a first and a second supply rail;
a primary connection in the primary circuit;
a secondary circuit providing the output current;
a secondary connection in the secondary circuit, the secondary connection connected to the primary connection;
a controller controlling one or more switches in the primary circuit to control the output current; and
a reactive circuit producing a reactive current;
the method comprising:
connecting a current sensing circuit to bypass or cancel the reactive current;
connecting the controller to the current sensing circuit; and
controlling the one or more switches based on a signal current sensed by the current sensing circuit.

Further features of various embodiments of the present invention are defined in the appended claims. It will be appreciated that features may be combined in various combinations in various embodiments of the present invention.

Throughout this specification, including the claims, the words "comprise", "comprising", and other like terms are to be construed in an inclusive sense, that is, in the sense of "including, but not limited to", and not in an exclusive or exhaustive sense, unless explicitly stated otherwise or the context clearly requires otherwise.

ADVANTAGEOUS EFFECTS OF INVENTION

Brief Description of Drawings

Description of Drawings

Figure 1:
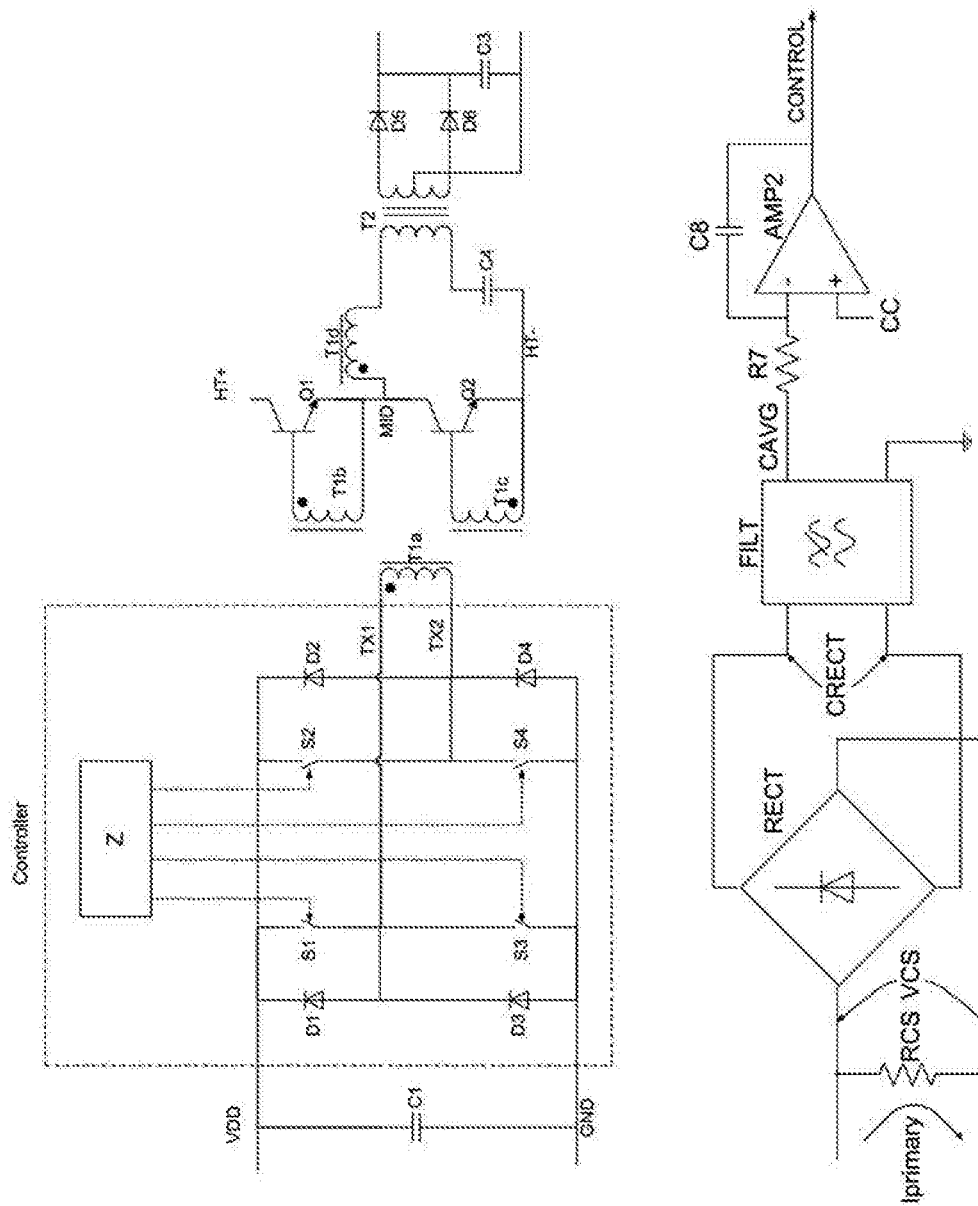
Figure 2:
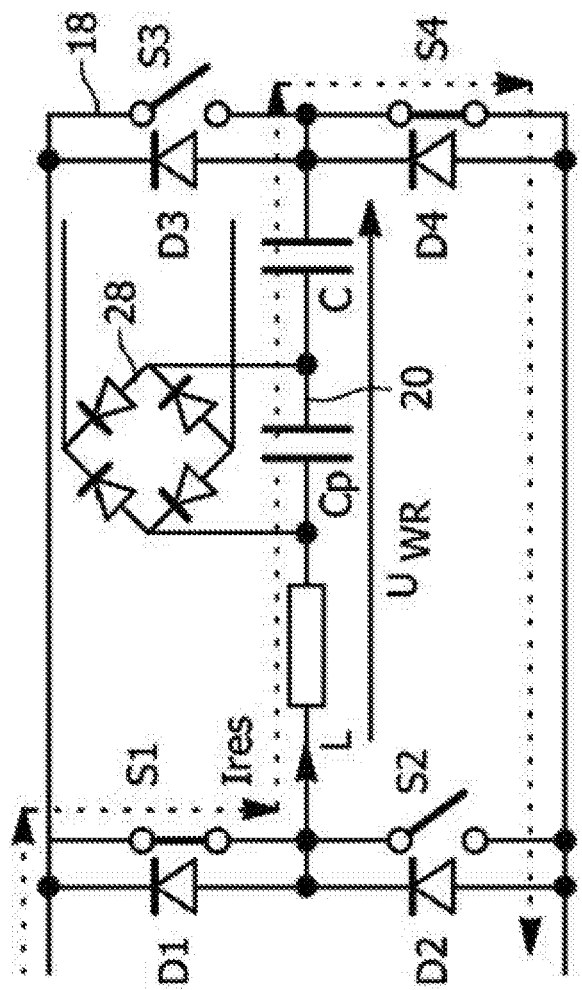
Figure 3:
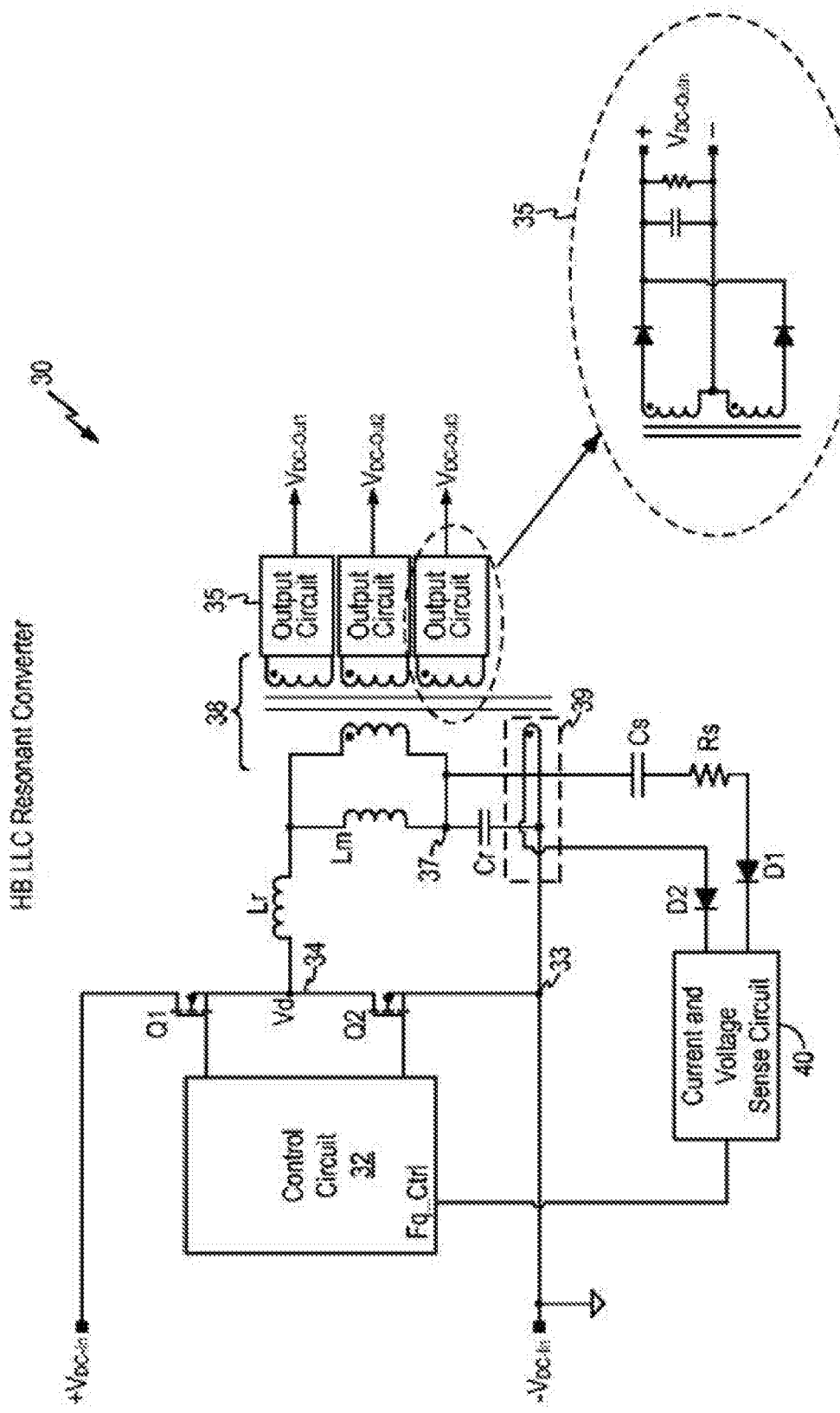
Figure 4:
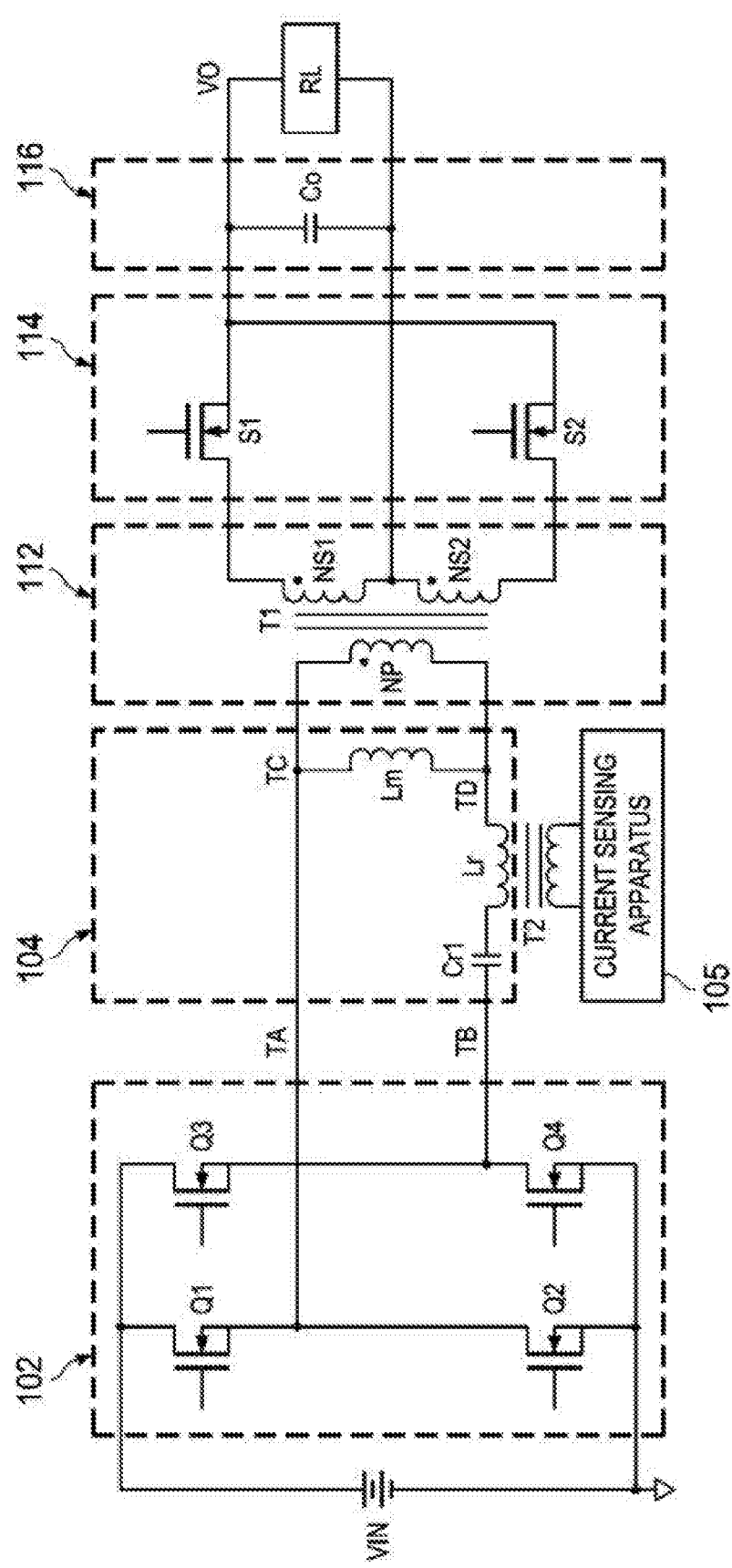
Figure 5:
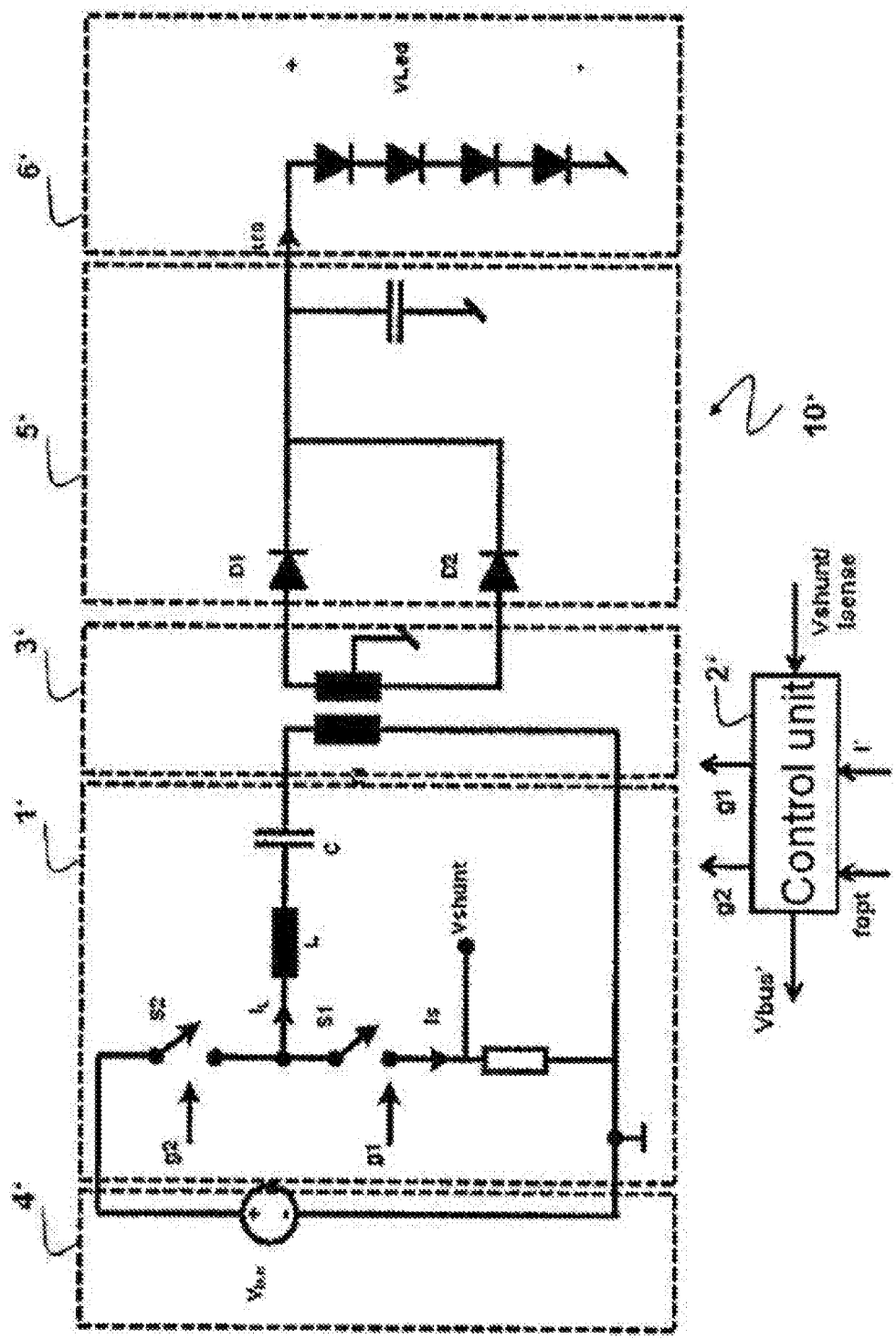
Figure 6:
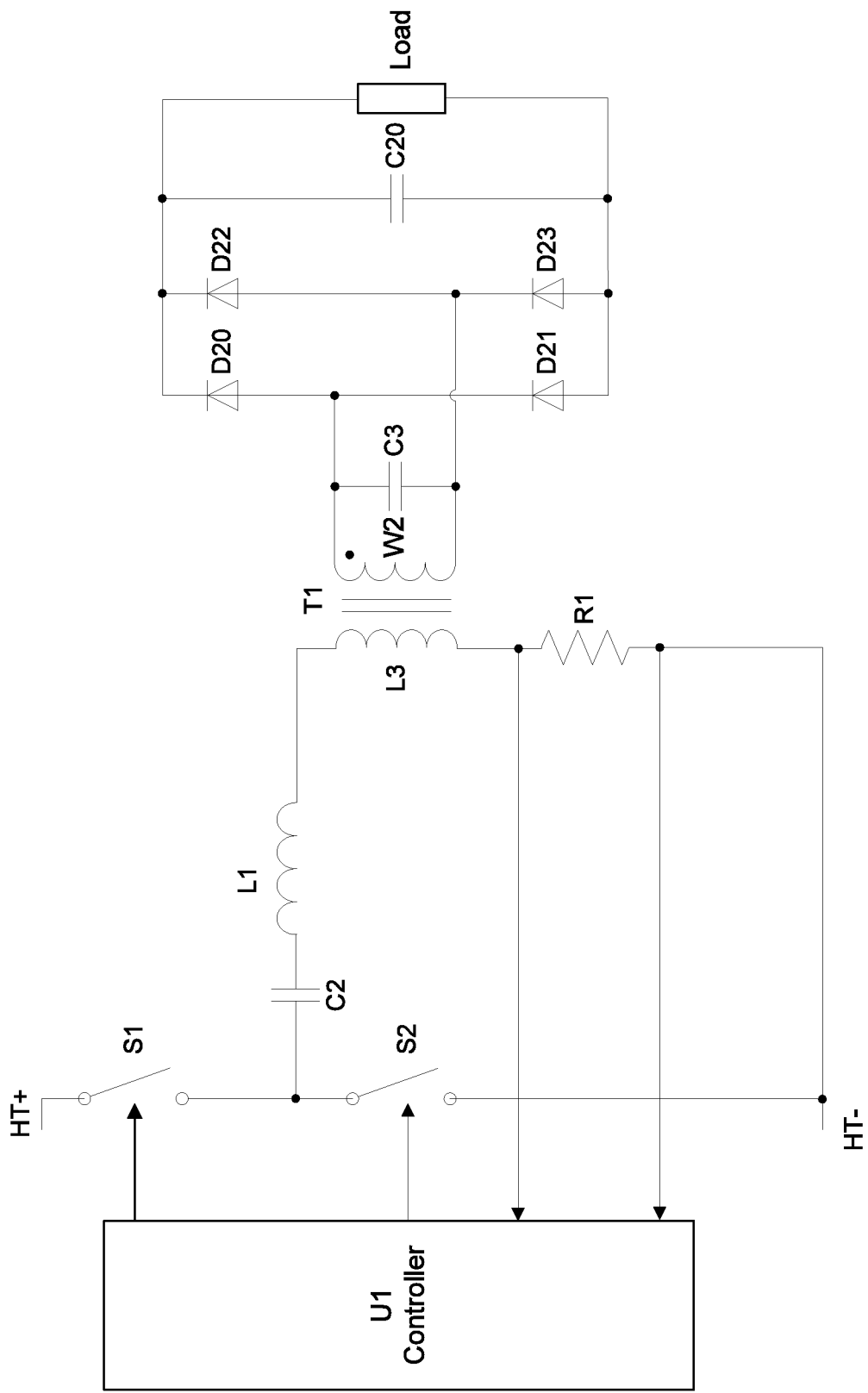
Figure 7:
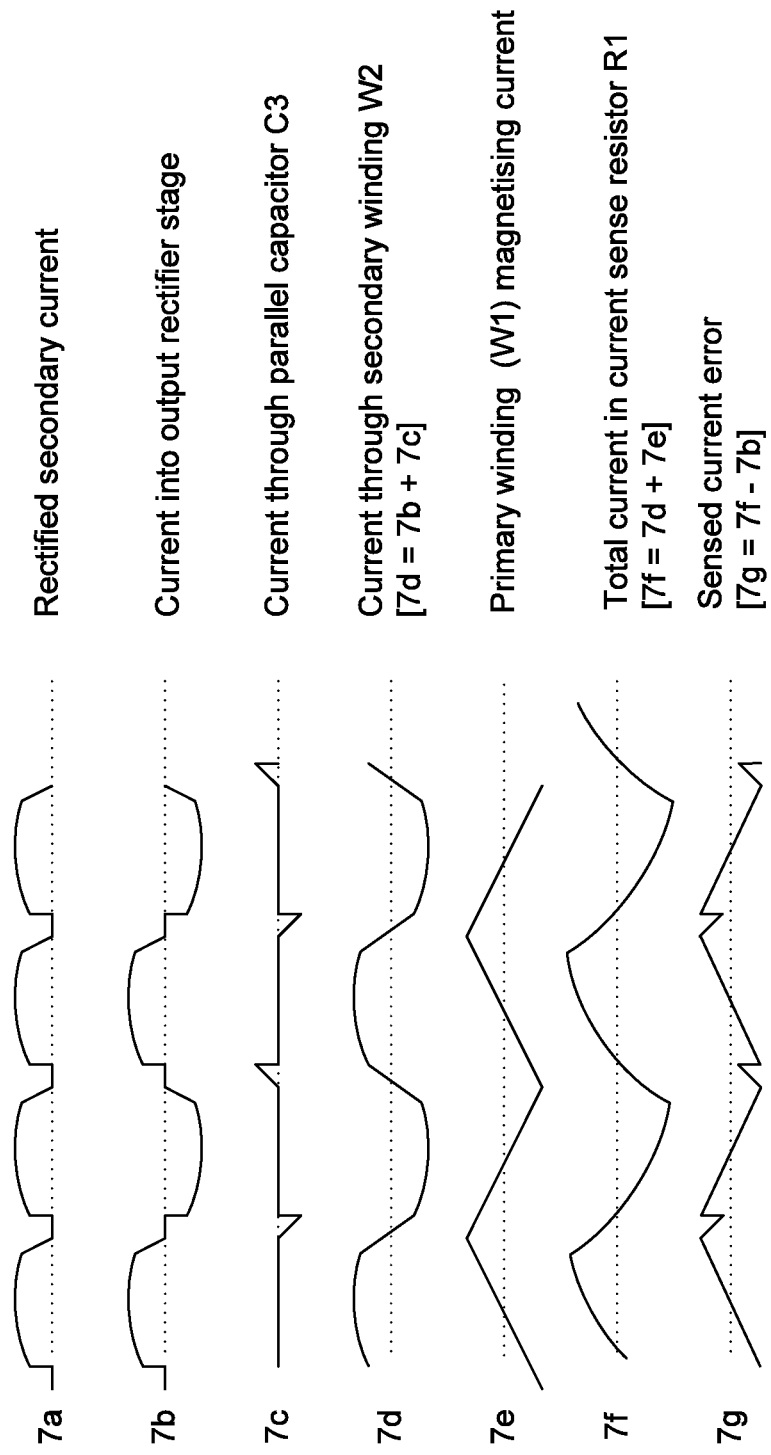
Figure 8:
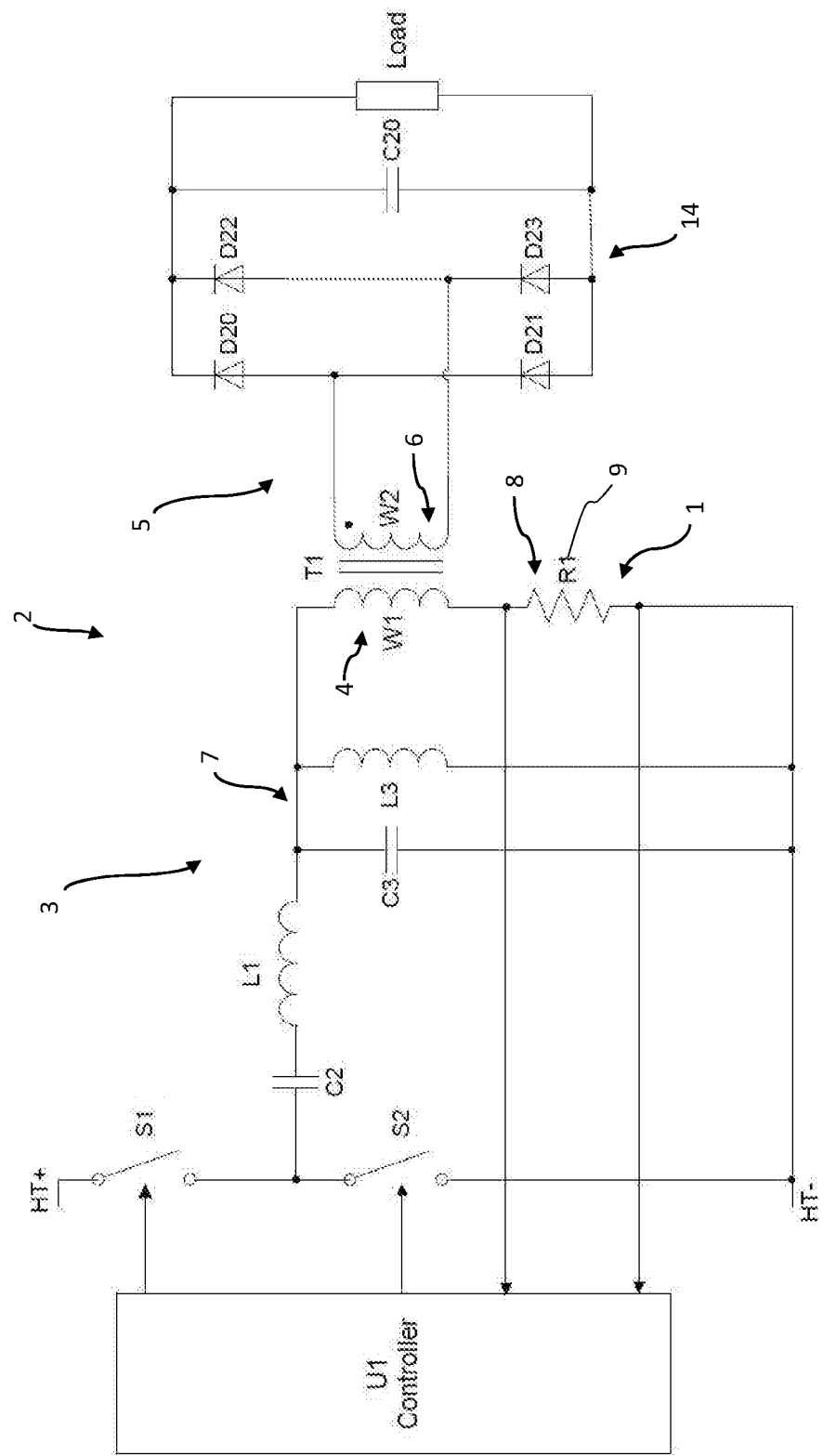
Figure 10:
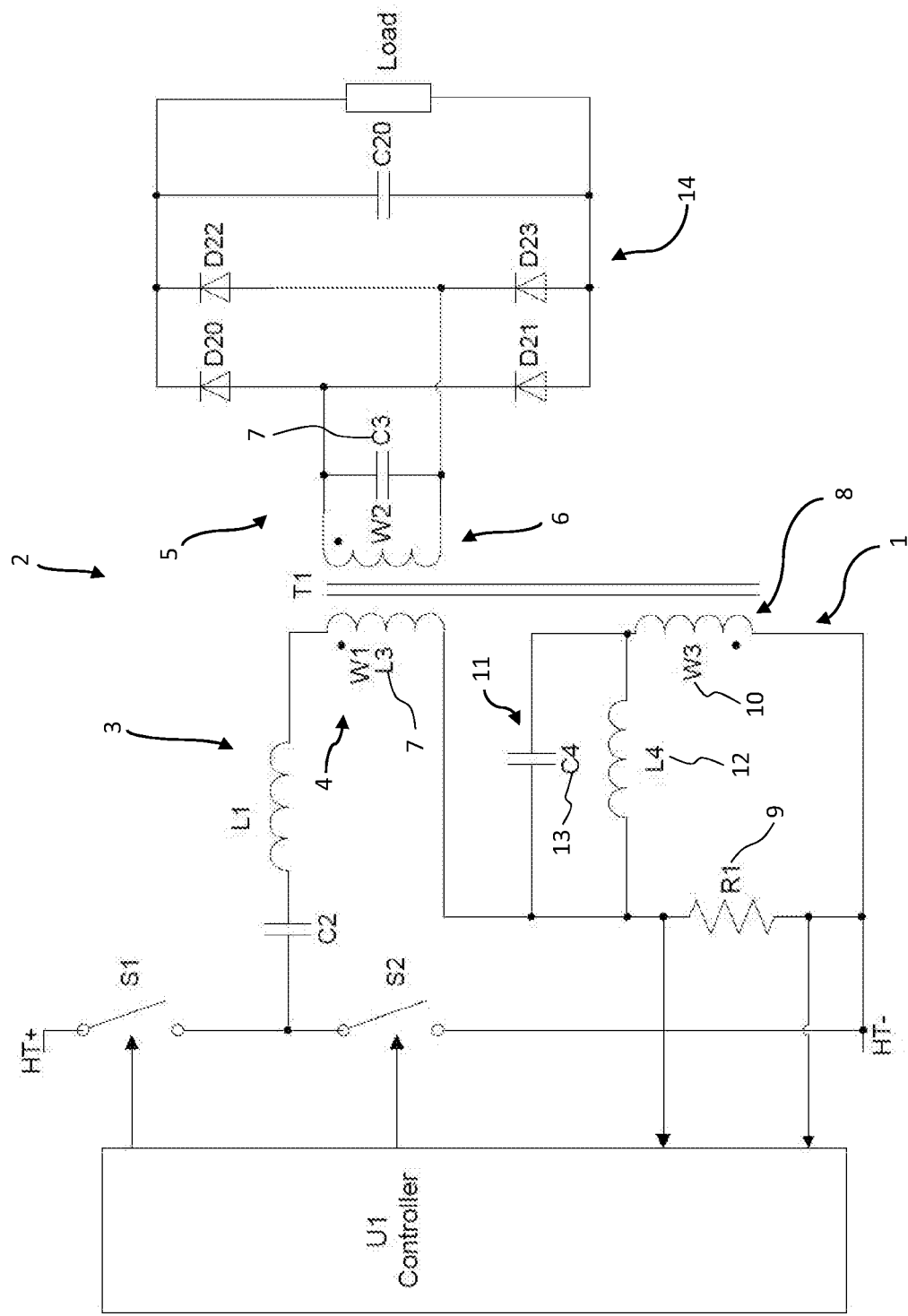
Figure 11:
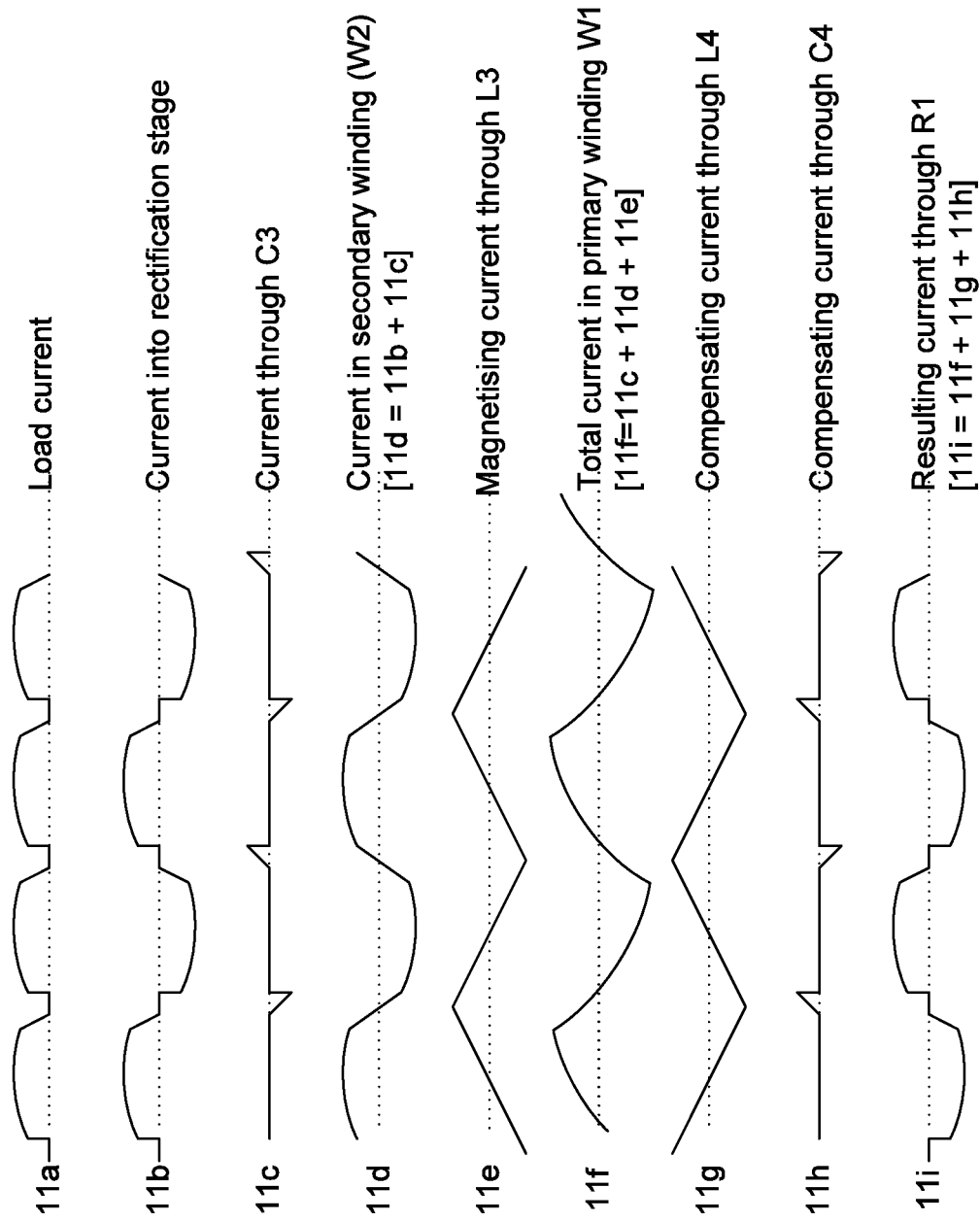
Figure 12:
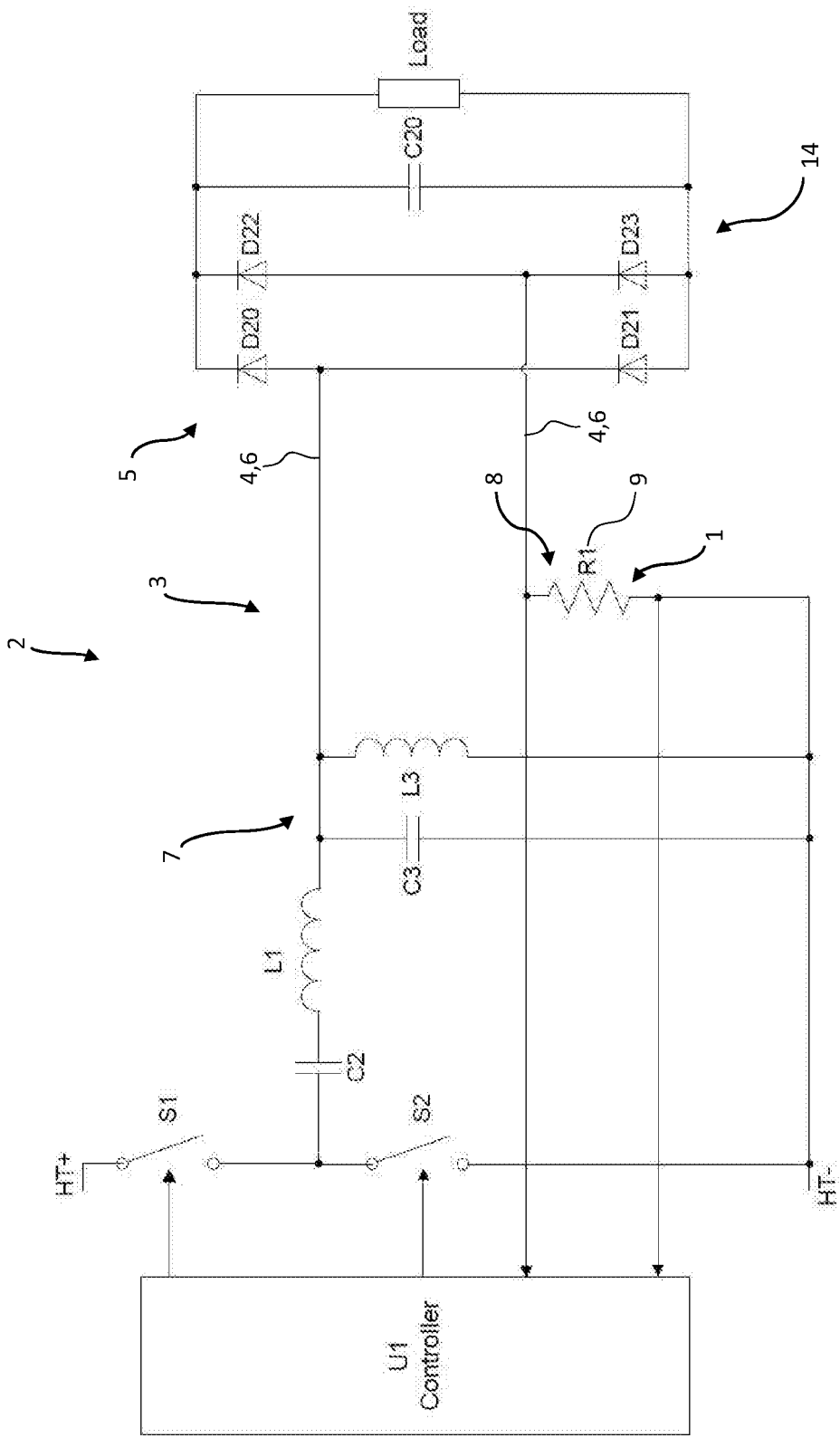

Preferred embodiments in accordance with the best mode of the present invention will now be described, by way of example only, with reference to the accompanying figures, in which:

FIG. 1 is a schematic diagram of a prior art current regulation circuit;

FIG. 2 is a schematic diagram of another prior art current regulation circuit;

FIG. 3 is a schematic diagram of another prior art current regulation circuit;

FIG. 4 is a schematic diagram of a yet another prior art current regulation circuit;

FIG. 5 is a schematic diagram of a further prior art current regulation circuit;

FIG. 6 is a schematic diagram of a prior art LLCC converter circuit;

FIGS. 7a to 7g are graphs of currents passing through various components of the circuit shown in FIG. 6;

FIG. 8 is a schematic diagram of a power converter circuit in accordance with an embodiment of the present invention;

FIGS. 9a to 9f are graphs of currents passing through various components of the circuit shown in FIG. 8;

FIG. 10 is a schematic diagram of a power converter circuit in accordance with another embodiment of the present invention;

FIGS. 11a to 11i are graphs of currents passing through various components of the circuit shown in FIG. 10; and FIG. 12 is a schematic diagram of a power converter circuit in accordance with a further embodiment of the present invention.

MODE FOR THE INVENTION

Mode for Invention

Referring to the figures, embodiments of the present invention provide a current control circuit 1 for a power converter 2. The power converter 2 has a primary circuit 3 for receiving a supply current across a first supply rail HT+ and a second supply rail HT−. There is a primary connection 4 in the primary circuit 3. The power converter also has a secondary circuit 5 providing an output current. There is a secondary connection 6 in the secondary circuit 5. The secondary connection 6 is connected to the primary connection 4. A controller U1 controls one or more switches in the primary circuit 3 to control the output current. In the embodiments shown, there are two switches S1 and S2. The nature of the power converter 2 is such that it has a reactive circuit 7 which produces a reactive current. The reactive circuit 7 can comprise one or more of a capacitive element, an inductive element, or a combination thereof. The reactive circuit 7 can be a virtual circuit where one or more of the capacitive element, inductive element, or combination thereof are intrinsic in the circuits of the power converter 2. Alternatively, the reactive circuit 7 can comprise actual components where one or more of the capacitive element, inductive element, or combination thereof can include an actual capacitor, or an actual inductor.

The current control circuit 1 comprises a current sensing circuit 8 connected to bypass or cancel the reactive current. The controller U1 is connected to the current sensing circuit 8 and controls the one or more switches S1 and/or S2 based on a signal current sensed by the current sensing circuit 8.

In some embodiments, as best shown in FIGS. 8 and 10, the primary connection 4 is a primary winding W1, and the secondary connection 6 is a secondary winding W2 inductively coupled to the primary winding W1.

In other embodiments, as best shown in FIG. 12, a wired connection directly connects the primary connection 4 to the secondary connection 6.

In the embodiments shown in FIGS. 8 and 12, the current sensing circuit 8 is connected in series with the primary connection 4. In these particular embodiments, the current sensing circuit 8 comprises a current sensing resistor 9 (R1 in FIGS. 8 and 12) connected in series with the primary connection 4. More specifically, in the embodiments shown, the current sensing resistor is connected directly in series with the primary connection 4. The reactive circuit 7 is connected across the primary connection 4 and the current sensing circuit 8, the current sensing circuit 8 thereby bypassing the reactive circuit 7. In the particular embodiments shown in FIGS. 8 and 12, the reactive circuit 7 comprises a parallel inductive element L3 connected across the primary connection 4 and the current sensing resistor 9. The reactive circuit 7 also comprises a parallel capacitive element C3 connected across the primary connection 4 and the current sensing resistor 9.

In the embodiment shown in FIG. 10, the reactive circuit 7 comprises a magnetizing inductive element L3 associated with the primary winding W1. The reactive circuit 7 also comprises a parallel capacitive element C3 connected in parallel with the secondary winding W2. The current sensing circuit 8 comprises an auxiliary winding 10 (W3 in FIG. 10) inductively coupled to the secondary winding W2. The current sensing circuit 8 also comprises an error correction network 11 connected in series with the auxiliary winding 10. The error correction network 11 produces an error correction current equal to and in opposite phase to the reactive current. The error correction network typically comprises one or more of an error correction capacitive element, an error correction inductive element, or a combination thereof. In the particular embodiment shown in FIG. 10, the error connection network 11 comprises an error correction inductive element 12 (L4 in FIG. 10) connected in parallel with an error correction capacitive element 13 (C4 in FIG. 10).

Staying with the embodiment shown in FIG. 10, the current sensing circuit 8 is connected in series with the error correction network 11, with the current sensing circuit 8 receiving the error correction current to cancel the reactive current. In the particular embodiment shown in FIG. 10, the current sensing circuit 8 comprises a current sensing resistor 9 (R1 in FIG. 10) connected in series with the error correction network 11, the current sensing resistor 9 receiving the error correction current to cancel the reactive current.

In all the embodiments shown in FIGS. 8, 10, and 12, the controller U1 can control the one or more switches S1 and/or S2 based on an average of the signal current sensed by the current sensing circuit 8. Alternatively or additionally, the controller U1 can control the one or more switches S1 and/or S2 based on a root-mean-square (RMS) of the signal current sensed by the current sensing circuit 8.

In these embodiments, the secondary circuit 5 further comprises a rectification circuit 14 to receive the output current and to provide a rectified output current. The rectified output current can be, for example, provided to at least one LED, or an LED lighting system. As another example, the rectified output current can be provided to at least one rechargeable battery.

These embodiments are described on the understanding that the LLCC topology is a superset of LLCC, LLC, LCC, and LC topologies, applicable to half-bridge and full bridge configurations.

In some embodiments of the present invention, such as those suitable for use in switched mode power supplies, the current can be split into two or more legs each with one or more resonant capacitors. In these cases, the current sensing circuit 8 is located in just one of the legs. It is appreciated that within the scope of this invention the current sensing circuit is still connected in series with the primary connection 4 in that each leg is connected in series with the primary connection even though each leg receives a portion of the current. Accordingly, in these cases, the current sensing circuit 8, being in only one leg, will only see a portion of the current.

As is appreciated by those skilled in the art, the present invention also provides, in one embodiment a method of controlling an output current in a power converter 2. The power converter 2 has a primary circuit 3 for receiving a supply current across a first supply rail HT+ and a second supply rail HT−. There is a primary connection 4 in the primary circuit 3. A secondary circuit 5 provides the output current. There is a secondary connection 6 in the secondary circuit 5, with the secondary connection 6 connected to the primary connection 4. A controller U1 controls one or more switches in the primary circuit 3 to control the output current. The power converter 2 has a reactive circuit 7 producing a reactive current. The method of controlling the output current in the power converter 2 comprises connecting a current sensing circuit 8 to bypass or cancel the reactive current, connecting the controller U1 to the current sensing circuit 8, and controlling the one or more switches based on a signal current sensed by the current sensing circuit 8. In some embodiments, the step of controlling the one or more switches based on a signal current sensed by the current sensing circuit is based on an average of the signal current. Additionally or alternatively, the step of controlling the one or more switches based on a signal current sensed by the current sensing circuit is based on an RMS of the signal current.

The embodiments of the present invention described in this specification are referenced to power converter designs based upon the LLCC topology. The LLCC topology is a superset of related topologies, and in particular, LLCC, LLC, LCC, and LC topologies, and can be applied to half-bridge and full-bridge configurations. The embodiments of the present invention as described are applicable to each of these topologies.

The embodiments shown in FIGS. 8 and 10 theoretically achieve the same result, but because of parasitic elements, one embodiment may be preferred over the other in a given application. Both methods work by isolating the reflected load component of the primary current and delivering this to the controller which is situated on the primary side of the power transformer T1, that is, the primary circuit 3. This signal can be rectified, filtered and used to control the output current of a power converter 2. The method is relatively simple to apply and provides accurate error compensation across a wide range of operating conditions.

For the purpose of accurate output current regulation, it is required that the monitored current sense signal (CS) accurately represents a scaled form of the output current pulses which are delivered by the output rectification stage. Therefore, in each embodiment, the various current waveforms and the resulting fidelity of the current sense signal are described.

FIG. 8 shows a half-bridge application comprising DC supply rails HT+ and HT− supplying a pair of switches S1 and S2 controlled by controller U1. The controller U1 provides a substantially square wave voltage source driving the series-resonant tank C2 and L1, parallel-resonant tank C3 and L3 supplying DC output power through a transformer T1 to the output rectification stage D20 to D23 (i.e. rectification circuit 14), and energy storage component C20 to the load.

Current flowing through the parallel capacitor and inductor C3 and L3 bypasses the current sensing element 9 (R1) to avoid any error contribution to the current sense signal. The transformer magnetising current does however flow through the current sensing element and therefore contributes some error to the current sense signal, but this is insignificant if the magnetising inductance is large. The controller U1 can also include compensation for this minor error.

Figure 9:
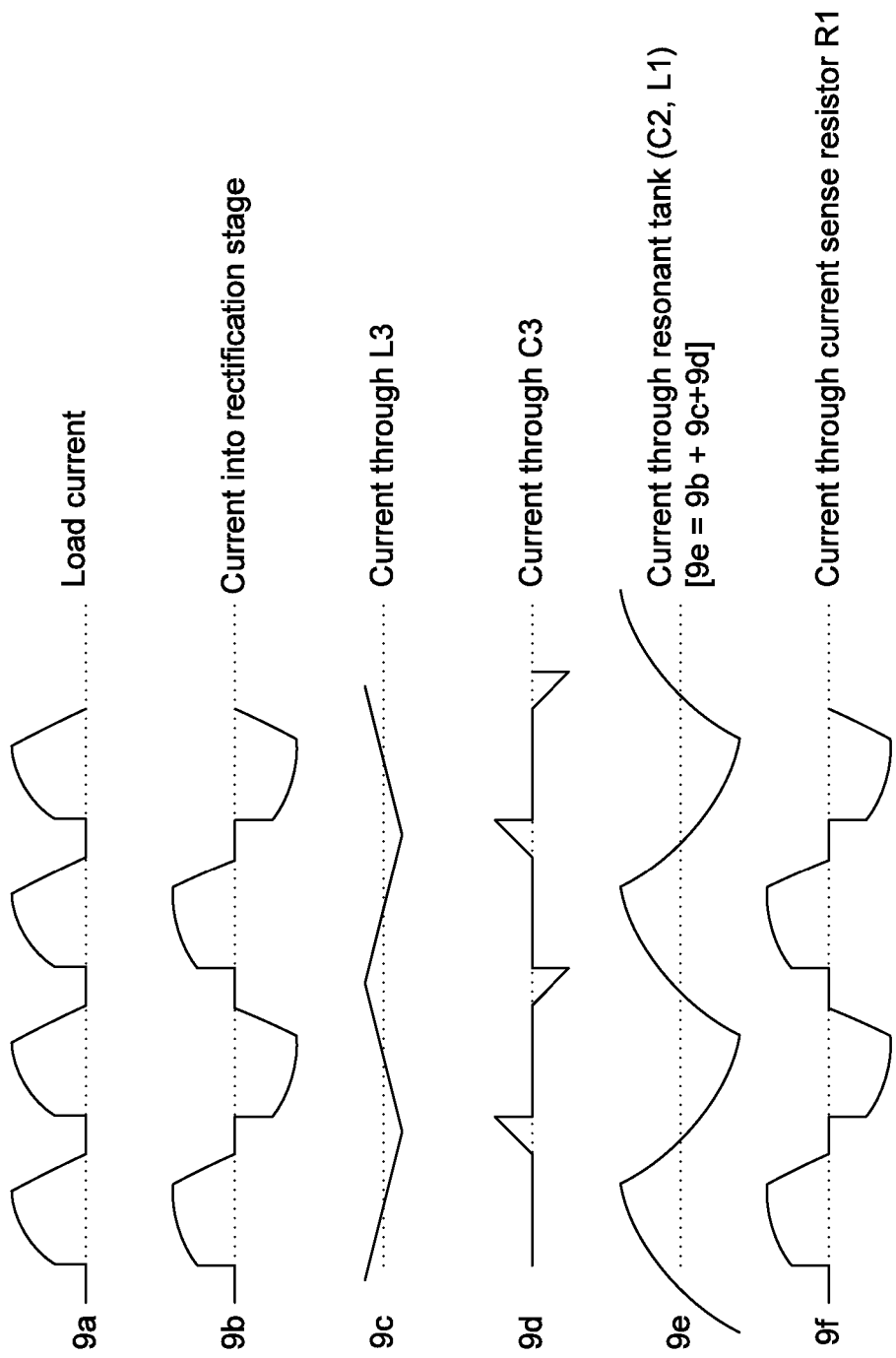

FIGS. 9a to 9f show the relevant current waveforms. The current flowing through the parallel capacitor C3 and inductor L3 bypasses the current sensing resistor so that any errors due to the C3 and L3 are avoided. FIG. 9b shows the output current of the secondary circuit 5 before the output current enters the rectification circuit 14. FIGS. 9c and 9d show the current passing through L3 and C3 respectively. FIG. 9f shows the current sensed by the controller that accurately represents the current delivered to the output shown in 9b.

The embodiment shown in FIG. 8 is a relatively simple implementation, but parasitic elements in a real manufactured circuit can lead to undesirable effects. In particular, leakage between windings in the transformer T1 can cause additional ringing that can lead to undesirable effects including increased switching losses and RF emissions, for example. In some implementations, it is therefore advantageous to place C3 in the secondary circuit 5, after the transformer leakage inductance to minimise this ringing, as best shown in FIG. 10. Additionally, it is preferable to include L3 in the transformer magnetising inductance in order to reduce costs, also as shown in FIG. 10. The problem with this is that a current sensing circuit in the primary circuit 3 will sense the additional current caused by C3 and the transformer magnetising current causing an error in measuring the average secondary current. The embodiment shown in FIG. 10 illustrates a simple method of removing the error so that a true average current can be sensed on the primary side of the galvanic barrier, that is, the primary circuit 3.

The embodiment in FIG. 10 is a half-bridge application comprising DC supply rails HT+ and HT− supplying a pair of switches S1 and S2 controlled by controller U1. The controller provides a substantially square wave voltage source driving the series-resonant tank C2 and L1, supplying DC output power through a transformer T1 with magnetising inductance L3 to parallel capacitor C3 and output rectification stage D20 to D23 (rectification circuit 14), and energy storage component C20 to the load. The auxiliary winding 10 (W3) on the transformer T1 drives the error correction network 11 (C4 and L4) to drive an anti-phase current into the current sensing resistor 9 (R1). The current through C4 and L4 is designed to generate a current through the current sensing resistor 9 to be equal and in opposite phase to the current generated by L3 and C3 thereby generating a voltage signal on current sensing resistor 9 that substantially represents the output current of the secondary circuit 5 before the output current enters the rectification circuit 14.

FIGS. 11a to 11i show the waveforms associated with the embodiment shown in FIG. 10. The current supplied to the load is shown in FIG. 11a, while the current prior to rectification is shown in FIG. 11b. The current in the secondary winding W2 (as shown in FIG. 11d) is the sum of the current through C3 (as shown in FIG. 11c) and the load current prior to rectification (as shown in FIG. 11b). The current in the primary winding W1 (as shown in FIG. 11f) is the current in the secondary winding W2 (multiplied by the turns ratio) plus the magnetising current through L3 (as shown in FIG. 11e). To generate a current proportional to the unrectified load current, the currents through the error correction network 11 (L4 and C4) are added to the primary current. The resulting current in the current sensing resistor 9 that is presented to the controller U1 is shown in FIG. 11i. The rectified average of this signal accurately represents the average load current.

To provide the best error correction for an exemplary application, the optimum values for C4 and L4 are given by the following equations:

$$C_4 = C_3 \cdot \frac{N_S^2}{N_A N_P}$$

$$L_4 = L_3 \cdot \frac{N_A}{N_P}$$

It is appreciated by those skilled in the art that the embodiments described above can be applied in a wide variety of ways. For example, the embodiments are equally applicable to LLC, LCC, LLCC resonant or other forward-type converters that have a reactive element that needs correction to enable accurate primary sensing current regulation. The embodiments presently described are shown with reference to the half-bridge topology, but are equally applicable to other topologies including full-bridge, multi-phase, push-pull, among others.

The invention is advantageously applicable to isolating power converters, but can also be usefully employed in non-isolating types. The invention is useful in situations where it is difficult to communicate the feedback signal representing the output current from the output circuit to the controller. For example, the controller may be referenced to a different supply rail from that which is connected to the load, such as may be found in applications incorporating passive power factor correction. In these applications, there is a significant cost advantage to be gained by using embodiments of the present invention to regulate the output current, as this avoids the higher cost of alternative regulation methods employing optocouplers, current sense amplifiers, level shifters, and the like. An example of a non-isolating application in accordance with another embodiment of the present invention similar to the embodiment shown in FIG. 8 is given in FIG. 12. In the embodiment of FIG. 12, instead of a transformer T1 connecting the primary circuit 3 and the secondary circuit 5 by way of the primary winding W1 and the secondary winding W2, a wired connection directly connects the primary connection 4 of the primary circuit 3 to the secondary connection 6 of the secondary circuit 5.

The output power can be delivered to the load using full-wave rectification (as shown in the preceding description), half-wave rectification or without any rectification. The error cancellation method is applicable to more complex resonant converter topologies, in which the reactive error correction network can optionally include other inductive, capacitive and resistive elements for the purposes of more accurately estimating the output load current by sensing the primary current. There can be more than one parallel-resonant circuit requiring error correction. One or more of these parallel-resonant circuits can be located on the secondary winding (as shown in the description above) or located on other transformer windings.

It is appreciated that the aforesaid embodiments are only exemplary embodiments adopted to describe the principles of the present invention, and the present invention is not merely limited thereto. Various variants and modifications may be made by those of ordinary skill in the art without departing from the spirit and essence of the present invention, and these variants and modifications are also covered within the scope of the present invention. Accordingly, although the invention has been described with reference to specific examples, it can be appreciated by those skilled in the art that the invention can be embodied in many other forms. It can also be appreciated by those skilled in the art that the features of the various examples described can be combined in other combinations. In particular, it is appreciated by those skilled in the art that there are different variations of the circuits described above within the scope of the present invention. There are many possible permutations of the circuit arrangements described above which will be obvious to those skilled in the art. Accordingly, the circuit components shown in the embodiments can be interchanged freely, placed in different arrangements or order, but still provide the functionality described in respect of the circuit as originally arranged or ordered in the described embodiments, and therefore, still falling within the scope of the present invention.

The invention claimed is:

1. A current control circuit for a power converter having:
   a primary circuit for receiving a supply current across a first and a second supply rail;
   a primary connection in the primary circuit;
   a secondary circuit providing an output current;
   a secondary connection in the secondary circuit, the secondary connection connected to the primary connection;
   a controller controlling one or more switches in the primary circuit to control the output current; and
   a reactive circuit producing a reactive current;
   the current control circuit comprising:
   a current sensing circuit connected to bypass or cancel the reactive current, the controller connected to the current sensing circuit and controlling the one or more switches based on a signal current sensed by the current sensing circuit.

2. A current control circuit according to claim 1 wherein the primary connection is a primary winding, and the secondary connection is a secondary winding inductively coupled to the primary winding.

3. A current control circuit according to claim 1 wherein a wired connection directly connects the primary connection to the secondary connection.

4. A current control circuit according to claim 1 wherein the reactive circuit comprises one or more of a capacitive element, an inductive element, or a combination thereof.

5. A current control circuit according to claim 1 wherein the current sensing circuit is connected in series with the primary connection.

6. A current control circuit according to claim 5 wherein the reactive circuit is connected across the primary connection and the current sensing circuit, the current sensing circuit thereby bypassing the reactive circuit.

7. A current control circuit according to claim 2 wherein the reactive circuit comprises a magnetizing inductive element associated with the primary winding.

8. A current control circuit according to claim 2 wherein the current sensing circuit comprises an auxiliary winding inductively coupled to the secondary winding, an error correction network connected in series with the auxiliary winding, the error correction network producing an error correction current equal to and in opposite phase to the reactive current.

9. A current control circuit according to claim 8 wherein the error correction network comprises one or more of an error correction capacitive element, an error correction inductive element, or a combination thereof.

10. A current control circuit according to claim 8 wherein the current sensing circuit is connected in series with the error correction network, the current sensing circuit receiving the error correction current to cancel the reactive current.

11. A current control circuit according to claim 10 wherein the current sensing circuit comprises a current sensing resistor connected in series with the error correction network, the current sensing resistor receiving the error correction current to cancel the reactive current.

12. A power converter having:
   a primary circuit for receiving a supply current across a first and a second supply rail;
   a primary connection in the primary circuit;
   a secondary circuit providing an output current;
   a secondary connection in the secondary circuit, the secondary connection connected to the primary connection;
   a controller controlling one or more switches in the primary circuit to control the output current;
   a reactive circuit producing a reactive current; and
   a current control circuit according to claim 1.

13. A power converter according to claim 12 wherein the controller controls the one or more switches based on an average of the signal current sensed by the current sensing circuit.

14. A power converter according to claim 12 wherein the controller controls the one or more switches based on a RMS of the signal current sensed by the current sensing circuit.

15. A power converter according to claim 12 wherein the secondary circuit further comprises a rectification circuit to receive the output current and to provide a rectified output current.

16. A method of controlling an output current in a power converter having:
   a primary circuit for receiving a supply current across a first and a second supply rail;
   a primary connection in the primary circuit;
   a secondary circuit providing the output current;
   a secondary connection in the secondary circuit, the secondary connection connected to the primary connection;
   a controller controlling one or more switches in the primary circuit to control the output current; and
   a reactive circuit producing a reactive current;
   the method comprising:
   connecting a current sensing circuit to bypass or cancel the reactive current;
   connecting the controller to the current sensing circuit; and
   controlling the one or more switches based on a signal current sensed by the current sensing circuit.

17. A method according to claim 16 wherein the primary connection is a primary winding, and the secondary connection is a secondary winding inductively coupled to the primary winding.

18. A method according to claim 16 wherein a wired connection directly connects the primary connection to the secondary connection.

19. A method according to claim 16 wherein the step of controlling the one or more switches based on a signal current sensed by the current sensing circuit is based on an average of the signal current.

20. A method according to claim 16 wherein the step of controlling the one or more switches based on a signal current sensed by the current sensing circuit is based on an RMS of the signal current.

* * * * *